(12) United States Patent
Bultitude (10) Patent No.: US 10,410,794 B2
(45) Date of Patent: Sep. 10, 2019

(54) MULTILAYER CERAMIC STRUCTURE

(71) Applicant: KEMET Electronics Corporation, Simpsonville, SC (US)

(72) Inventor: John Bultitude, Simpsonville, SC (US)

(73) Assignee: KEMET Electronics Corporation, Fort Lauderdale, FL (US)

( * ) Notice: Subject to any disclaimer, the term of this patent is extended or adjusted under 35 U.S.C. 154(b) by 0 days.

(21) Appl. No.: 15/642,643

(22) Filed: Jul. 6, 2017

(65) Prior Publication Data

US 2018/0012706 A1 Jan. 11, 2018

Related U.S. Application Data (60) Provisional application No. 62/360,648, filed on Jul. 11, 2016.

(51) Int. Cl.
| | |
|---|---|
| *H01G 4/33* | (2006.01) |
| *H01G 4/012* | (2006.01) |
| *H01G 4/248* | (2006.01) |
| *H01G 4/002* | (2006.01) |
| *H01G 4/008* | (2006.01) |
| *H01G 4/12* | (2006.01) |
| *H01G 4/005* | (2006.01) |
| *H01G 4/30* | (2006.01) |
| *H01G 4/232* | (2006.01) |

(52) U.S. Cl.
CPC .............. *H01G 4/33* (2013.01); *H01G 4/002* (2013.01); *H01G 4/005* (2013.01); *H01G 4/008* (2013.01); *H01G 4/012* (2013.01); *H01G 4/12* (2013.01); *H01G 4/232* (2013.01); *H01G 4/248* (2013.01); *H01G 4/30* (2013.01)

(58) Field of Classification Search
CPC .......... H01G 4/005; H01G 4/06; H01G 4/012; H01G 4/12; H01G 4/30; H01G 4/35; H01G 4/232; H01G 4/248
See application file for complete search history.

(56) References Cited

U.S. PATENT DOCUMENTS

| | | | |
|---|---|---|---|
| 8,576,537 B2 | 11/2013 | Prymak | |
| 10,068,707 B2 * | 9/2018 | McConnell | B23K 1/0016 |
| 2003/0190462 A1 * | 10/2003 | Nakamura | H01G 4/0085 |
| | | | 428/304.4 |
| 2006/0087796 A1 * | 4/2006 | Yamazaki | C04B 35/4682 |
| | | | 361/321.2 |
| 2010/0109804 A1 * | 5/2010 | Feichtinger | H01C 7/10 |
| | | | 333/172 |

(Continued)

FOREIGN PATENT DOCUMENTS

| | | | | |
|---|---|---|---|---|
| JP | 407240337 | * | 9/2015 | H01G 4/12 |

*Primary Examiner* — Nguyen T Ha
(74) *Attorney, Agent, or Firm* — Joseph T. Guy; Patent Filing Specialist, Inc.

(57) ABSTRACT

An improved multilayer ceramic capacitor is described. The multilayered ceramic capacitor comprises first internal electrodes and second internal electrodes. The first internal electrodes and said second internal electrodes are parallel with dielectric there between. A first external termination is in electrical connection with the first internal electrodes and a second external termination is in electrical contact with the second internal electrodes. A closed void layer, comprising at least one closed void, is between electrodes.

36 Claims, 7 Drawing Sheets

(56) References Cited

U.S. PATENT DOCUMENTS

| | | | |
|---|---|---|---|
| 2011/0141660 A1* | 6/2011 | Jeong | H01G 4/12 361/321.4 |
| 2012/0314336 A1* | 12/2012 | Ogawa | H01G 4/008 361/305 |
| 2013/0208399 A1* | 8/2013 | Morita | H01G 4/30 361/301.4 |
| 2015/0146343 A1 | 5/2015 | Ellmore et al. | |
| 2015/0170842 A1* | 6/2015 | An | H01G 4/30 361/321.2 |
| 2016/0111216 A1* | 4/2016 | Lee | H01G 4/30 361/301.4 |
| 2016/0240310 A1* | 8/2016 | Kim | H01G 4/12 |
| 2017/0358397 A1* | 12/2017 | McConnell | H01G 4/38 |

\* cited by examiner

MULTILAYER CERAMIC STRUCTURE

CROSS-REFERENCE TO RELATED APPLICATIONS

The present application claims priority to U.S. Provisional Patent Application No. 62/360,648 filed Jul. 11, 2016 which is incorporated herein by reference.

FIELD OF THE INVENTION

The present invention is related to an improved multilayer ceramic capacitor (MLCC) wherein closed voids are incorporated in a closed void layer within the body of the MLCC and between different regions of active electrodes preferably of opposite polarity thereby providing improvements in physical robustness as evidenced by improved resistance to damage through mechanical stresses induced by electrostriction and reduced microphonic noise.

BACKGROUND

Multilayered ceramic capacitors are widely used and their acceptance in a variety of electronic applications and devices is rapidly expanding. Of utmost importance is the desire to increase capability to operate in higher electric fields to enable higher capacitance per unit volume and their expanded use in alternating current (AC) applications.

A disadvantage of multilayer ceramic capacitors is the electrostrictive, or piezoelectric, properties of the ceramic. Ceramics with large electric dipoles such as ferroelectric and anti-ferroelectrics, that are desirable for their high dielectric constants to achieve higher capacitance, have a high degree of electrostriction where these dipoles that can be arranged into domains align with the electric field. At high fields a high degree of alignment occurs through this electrostrictive effect that results in a movement of the MLCC. A high electric field or repetitive application of high fields can result in component failures due to cracking induced by the mechanical stress. This is further compounded in cases where high AC fields are applied that result in a 180° change of direction of dipoles in their respective domains resulting in an oscillatory movement. In severe cases, cracking is observed in the body of the MLCC caused by these stresses, that are also observed in piezoelectric actuators. In some cases the cracks can allow electrical bridging between internal electrodes of opposite polarity which compromises the electrical integrity often leading to failure of the component.

The oscillatory movement of the ceramic can also manifest as microphonic noise wherein the microphonic noise of multiple capacitors may become harmonic and noticeable to users of the electronic equipment. This is particularly undesirable in consumer electronics and especially in electronics intended to have high fidelity such as speakers, headphones and the like.

Due to the problems associated with oscillatory movement in the ceramic the thickness of the active layers is typically high to protect against degradation which limits the capacitance that can be achieved within a given capacitor volume. Therefore, the volumetric efficiency, defined as the capacitance per unit volume, has been limited with MLCC's. This limit is contrary to the well-known and long standing desire to continually miniaturize electronic devices and components therein.

U.S. Publ. Pat. App. No. 2015145343, which is incorporated herein by reference, teaches the use of an open low ceramic density, or sponge layer, as a sacrificial layer between two capacitive stacks to form the body of the capacitor. Though mitigated, oscillation still transmits through the layer of lower ceramic density and, in some cases, may be worse since the stress is transmitted through an area which functions as a pillar between two oscillating planes thereby allowing an oscillation in one plane to impart a point of pressure on the adjacent plane through a strut of the sponge layer. Yet another disadvantage is the manufacturing inconveniences. The stacked layer is formed as a large sheet with a continuous layer of low density ceramic between stacks of capacitive couples. During the manufacturing process the large sheet is diced into small elements. The interface between the capacitive couple and stress layer is prone to degradation due to the necessarily low structural integrity of the low density, or sponge, area. Yet another disadvantage is realized in the ability of processing materials, such as plating material or solder, to infuse into the sponge like stress layer thereby compromising performance of the component.

U.S. Pat. No. 8,576,537, which is incorporated herein by reference, teaches flex mitigation voids extending to the edge of the capacitor wherein any crack propagated by board flexure terminates at the flex void thereby mitigating the crack from propagating into the internal electrodes. The flex propagation voids must be external to the capacitive couple to function and therefore provide no benefit to the mitigation of oscillatory movement in the capacitor between electrodes.

In spite of the efforts of the skilled artisan there is still a need for an MLCC which can withstand higher electric fields and the oscillatory movement of ceramic under high AC voltage without damage to the ceramic or creation of microphonic noise.

SUMMARY OF THE INVENTION

It is an object of the invention to provide an improved capacitor and particularly an MLCC capable of withstanding higher electric fields including AC voltage without deleterious effects or excessive microphonic noise generation.

A particular feature of the invention is the ability to create the inventive device utilizing conventional manufacturing facilities.

These and other embodiments, as will be realized, are provided in a multilayer ceramic capacitor comprising first internal electrodes and second internal electrodes. The first internal electrodes and said second internal electrodes are parallel with dielectric there between. A first external termination is in electrical connection with the first internal electrodes and a second external termination is in electrical contact with the second internal electrodes. A closed void layer, comprising at least one closed void, is between electrodes.

The another embodiment is provided in a method for forming a multilayered ceramic capacitor comprising: forming a layered arrangement comprising at least one layered sequence comprising a first internal electrode precursor layer, a ceramic precursor layer, a second internal electrode precursor layer and another ceramic precursor layer wherein at least one ceramic precursor layer includes a closed void precursor layer; heating the layered arrangement to form a capacitor wherein: the first internal electrode precursor layer forms a first internal electrode; the second internal electrode precursor layer forms a second internal electrode; each ceramic precursor layer forms dielectric; and the closed void precursor layer forms a first closed void layer comprising at least one closed void; forming a first external termination on the capacitor wherein the first external termination is in electrical contact with the first internal electrodes; and forming a second external termination on the capacitor wherein the second external termination is in electrical contact with the second internal electrodes Yet another embodiment is provided in a multilayer ceramic capacitor comprising a first zone comprising a first capacitive couple comprising a first set of parallel interleaved internal electrodes wherein adjacent internal electrodes of the first set of parallel internal electrodes have opposite parallel and dielectric there between. The multilayered ceramic capacitor also has a second zone comprising a second capacitive couple comprising a second set of parallel interleaved internal electrodes wherein adjacent internal electrodes have opposite parallel and dielectric there between. A first closed void layer is between the first zone and second zone wherein first closed void layer comprising at least one closed void.

DESCRIPTION

The present invention is related to an improved MLCC which is less susceptible to degradation or defect propagation upon application of high electric fields including AC voltage. Even more specifically, the present invention is related to an MLCC comprising a closed void between internal electrodes of opposite polarity.

The invention will be described with reference to the figures which from an integral non-limiting component of the instant disclosure. Throughout the description similar elements will be numbered accordingly.

Figure 1A:
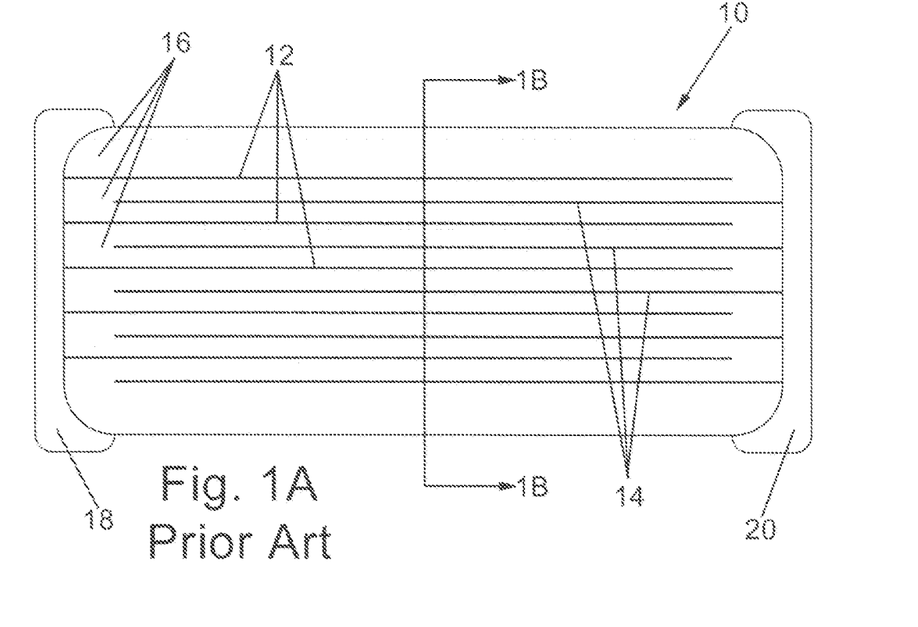
FIGS. 1A and 1B are cross-sectional schematic views of a prior art multilayered ceramic capacitor.
Figure 1B:
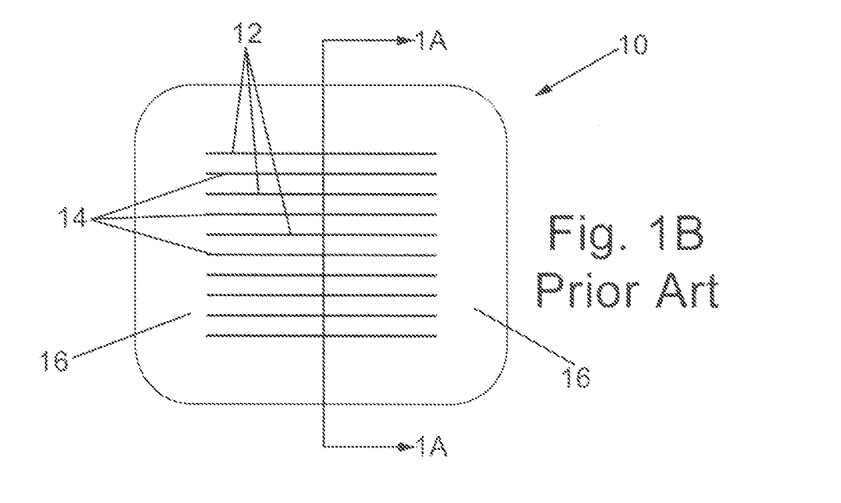

A conventional MLCC will be described with reference to FIGS. 1A and 1B wherein an MLCC is illustrated in cross-sectional schematic side view in FIG. 1A and cross-sectional schematic end view in FIG. 1B. In FIGS. 1A and 1B a multilayered ceramic capacitor, generally represented at 10, comprises interleaved parallel electrodes, 12 and 14, with dielectric, 16, there between wherein adjacent internal electrodes terminate at external terminations, 18 and 20, of opposite polarity as known in the art. As would be realized from the discussion herein the ceramic between electrodes of alternate polarity is susceptible to electrostrictive induced movement on application of an electric field and oscillatory movement when subjected to high AC voltages.

The present invention provides at least one closed void layer between electrodes of opposite polarity within the monolithic body of interleaved ceramic and electrodes. These closed void layers each comprise at least one closed void represented as an area which is void of ceramic wherein the closed voids are circumnavigated, preferably by ceramic, having a density consistent with the remainder of the ceramic body. The purpose of the closed voids is to relieve the mechanical stresses by cracking preferentially to relieve the stress thereby mitigating propagation of the stress to areas between the electrodes of opposed polarity. The closed porous layer also reduces the effective dielectric constant between the opposed electrodes lowering the electric field coupling that leads to electrostriction. Some key advantages of this invention include the ability to incorporate the closed voids within a very thin cross-sectional area thereby leaving a larger volume for the active electrodes and dielectric.

The closed void, or total volume of all closed voids in a closed void layer, represents at least 10 vol. % to no more than 90 vol. % of the total volume of the closed void layer. More preferably, the closed void, or total volume of all closed voids in a closed void layer, represents at least 50 vol. % to no more than 80 vol. % of the total volume of the closed void layer. The ceramic band preferably represents at least 10 vol. % to no more than 90 vol. % of the total volume of the closed void layer.

The closed void layer is defined as a layer parallel to the internal electrodes with a thickness of the closed voids in the closed void layer. There is preferably a layer of ceramic between each side of the closed void layer and closest internal electrode. The closed void layer is preferably at least 0.2 µm thick, as measured perpendicular to the planes of internal electrodes, to no more than 10 µm thick with the ceramic band and closed void having the same thickness as the closed void layer by definition. More preferably, the closed void layer is no more than 5 µm thick. Below a thickness of about 0.2 µm the sheet becomes difficult to handle in a manufacturing environment. Above a thickness of 10 µm the benefits are not sufficient to justify the increase in capacitor size.

Figure 2:
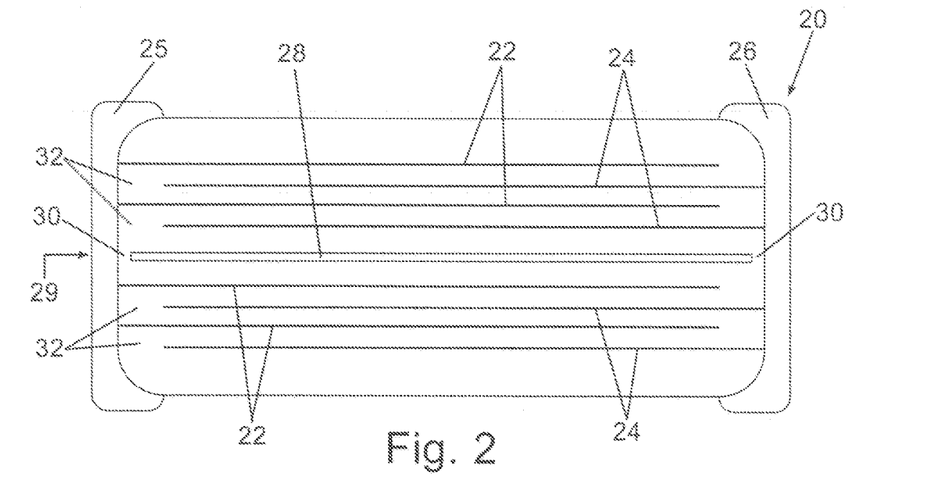
FIG. 2 is a cross-sectional schematic view of an embodiment of the invention.

An embodiment of the invention will be described with reference to FIG. 2. In FIG. 2 a capacitor, generally represented schematically at 20, comprises internal electrodes, 22 and 24, wherein adjacent electrodes terminate at different external terminations, 25 and 26, and are therefore of opposite electrical polarity. The internal electrodes have ceramic, 32, there between. A closed void, 28, in a closed void layer, 29, is between electrodes of opposite polarity and therefore capable of relieving any stress created in the ceramic from oscillatory movement during application of high AC voltage. The closed void is circumnavigated by a ceramic band, 30, thereby encasing the closed void within the closed void layer. A closed void, as described herein does not exchange atmosphere with the external environment.

Figure 3:
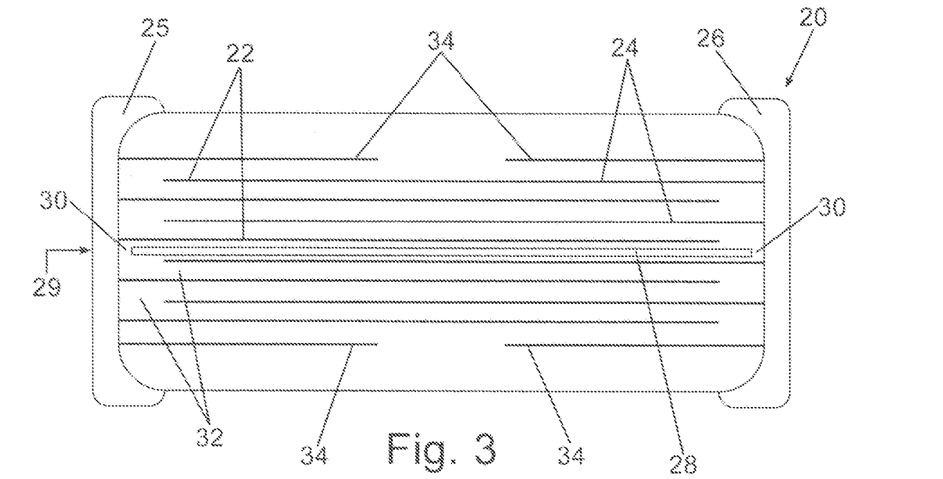
FIG. 3 is a cross-sectional schematic view of an embodiment of the invention.

An embodiment of the invention will be described with reference to FIG. 3. In FIG. 3 a capacitor, generally represented schematically at 20, comprises internal electrodes, 22 and 24, with ceramic, 32, as a dielectric between the internal electrodes. Adjacent internal electrodes terminate at external terminations, 25 and 26. A closed void layer, 29, comprises a closed void, 28, which is circumnavigated by a ceramic band, 30, as described with reference to FIG. 2. Shield electrodes, 34, are illustrated wherein shield electrodes are defined as coplanar active electrodes of opposite polarity positioned as the outermost internal electrodes in an MLCC. Shield electrodes are in electrical contact with the external termination and inhibit arcing from the external termination to the internal electrode of opposite polarity.

Figure 4:
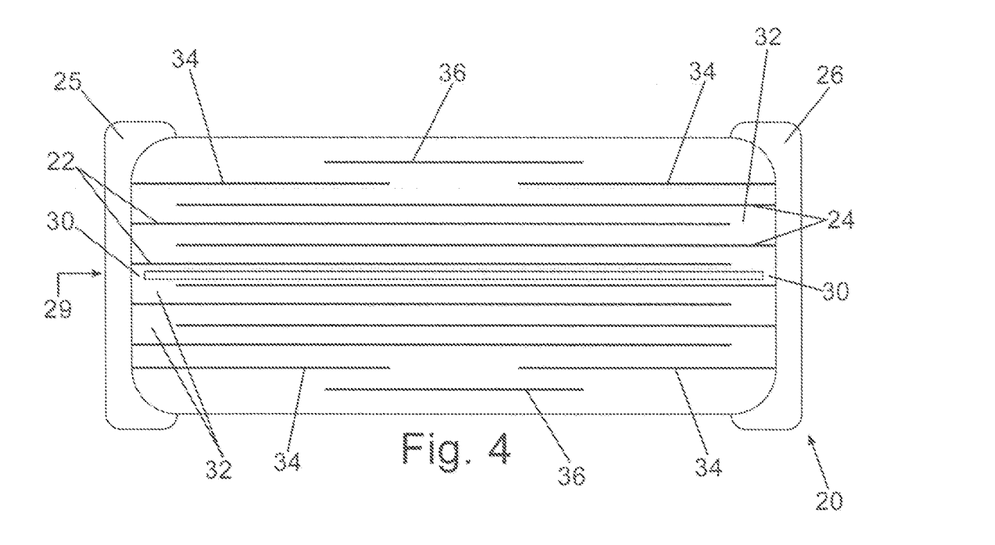
FIG. 4 is a cross-sectional schematic view of an embodiment of the invention.

An embodiment of the invention will be described with reference to FIG. 4. In FIG. 4 a capacitor, generally represented schematically at 20, comprises internal electrodes, 22 and 24, with ceramic, 32, as a dielectric between the internal electrodes. Adjacent internal electrodes terminate at different external terminations, 25 and 26. A closed void layer, 29, comprises a closed void, 28, which is circumnavigated by a ceramic band, 30. The ceramic band and shield electrodes, 34, are described with reference to FIG. 2. An external floating electrode, 36, provides additional shielding protection and additional marginal capacitance from the shield electrodes. An external floating electrode is defined herein as a floating electrode with active electrodes on only one side. Since those internal electrodes on either side of the closed void function, to a large degree, as independent capacitive couples, the MLCC of FIG. 4 can be considered to be in two distinct zones with a first zone being the capacitive couple, and internal electrodes, above the closed void layer and the second zone being the capacitive couple, and internal electrodes, below the closed void layer. It is preferably that the two zones have internal electrodes of opposite polarity adjacent the closed void layer.

Figure 5:
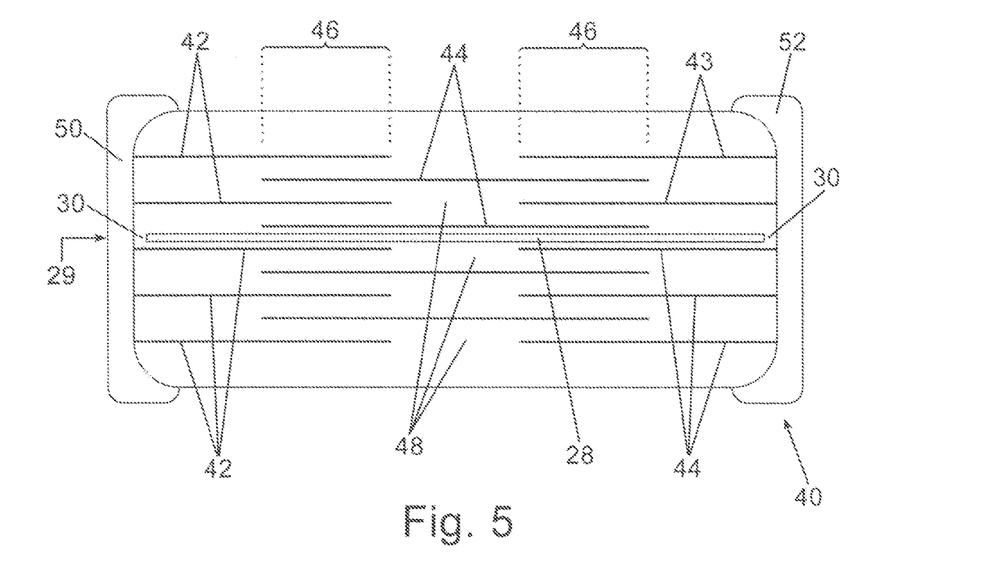
FIG. 5 is a cross-sectional schematic view of an embodiment of the invention.

An embodiment of the invention will be described with reference to FIG. 5. In FIG. 5 a capacitor, generally represented schematically at 40, comprises coplanar active internal electrodes, 42 and 43, of opposite polarity with floating electrodes, 44, in a plane parallel to the coplanar active internal electrodes and preferably each floating electrode has coplanar active internal electrodes adjacent to each side. The coplanar active electrodes terminate at different external terminations, 50 and 52. Ceramic, 48, between adjacent electrodes functions as the dielectric. An active electrode is defined herein as an internal electrode which is in electrical contact with an external termination. A floating electrode is an internal electrode which is not in electrical contact with an external termination. The floating electrodes and active electrodes have overlap regions, 46. A closed void, 28, which is circumnavigated by a ceramic band, 30, is in a closed void layer, 29.

Figure 6:
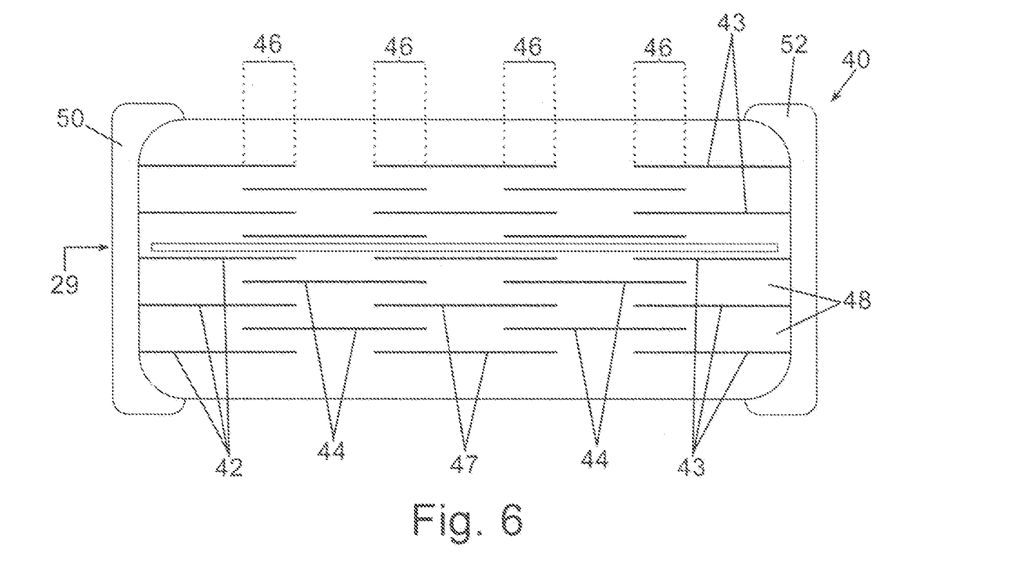
FIG. 6 is a cross-sectional schematic view of an embodiment of the invention.

An embodiment of the invention will be described with reference to FIG. 6. In FIG. 6 a capacitor, generally represented schematically at 40, comprises coplanar active internal electrodes, 42 and 43, of opposite polarity with first floating electrodes, 44, in a plane parallel to the coplanar active internal electrodes and preferably each first floating electrode has coplanar active internal electrodes adjacent to each side. The coplanar active electrodes terminate at different external terminations, 50 and 52. Ceramic, 48, between adjacent electrodes functions as the dielectric. Second floating electrodes, 47, are coplanar with active electrodes, 42 and 43, thereby providing multiple overlap regions, 46.

Figure 7:
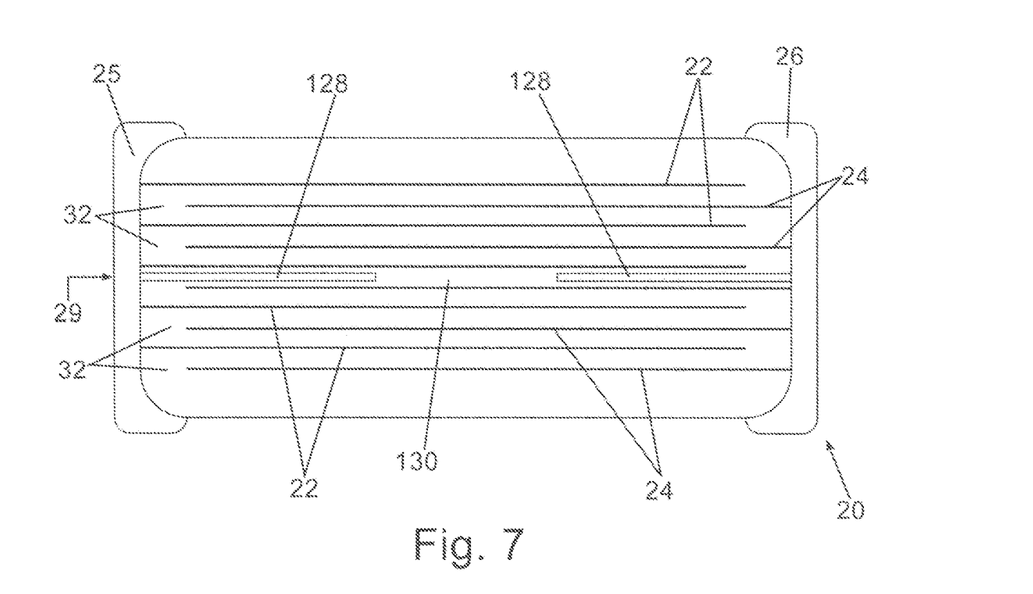
FIG. 7 is a cross-sectional schematic view of an embodiment of the invention.

An embodiment of the invention will be described with reference to FIG. 7. In FIG. 7 a capacitor, generally represented schematically at 20, comprises internal electrodes, 22 and 24, wherein adjacent electrodes terminate at different external terminations, 25 and 26, and are therefore of opposite polarity. The internal electrodes have ceramic, 32, there between. Closed voids, 128, in a closed void layer, 29, are between electrodes of opposite polarity and therefore the closed voids are capable of relieving any stress created in the ceramic from oscillatory movement during application of high AC voltage. The closed voids are circumnavigated by a combination of ceramic in a partial ceramic band, 130, and external terminations, 25 and 26, thereby encasing the closed void in the plane of the closed void layer.

Figure 8:
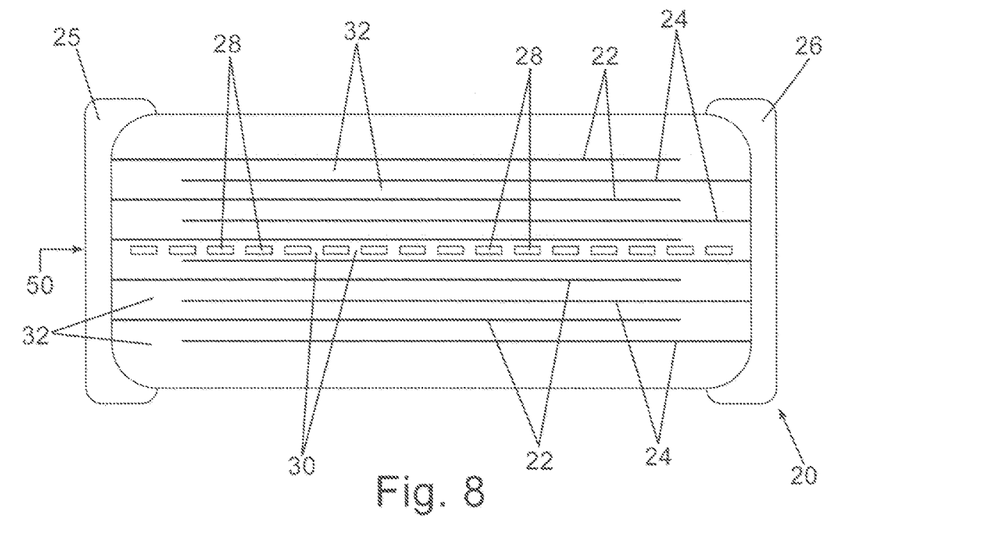
FIG. 8 is a cross-sectional schematic view of an embodiment of the invention.

An embodiment of the invention will be described with reference to FIG. 8. In FIG. 8 a capacitor, generally represented schematically at 20, comprises internal electrodes, 22 and 24, wherein adjacent electrodes terminate at different external terminations, 25 and 26, and are therefore of opposite polarity. The internal electrodes have ceramic, 32, there between. A multiplicity of closed voids, 28, are arranged in a closed void layer, 50, wherein the closed void layer has electrodes of opposite polarity adjacent thereto. Each closed void is circumnavigated by a ceramic band, 30, thereby encasing each closed void within the closed void layer.

Figure 9:
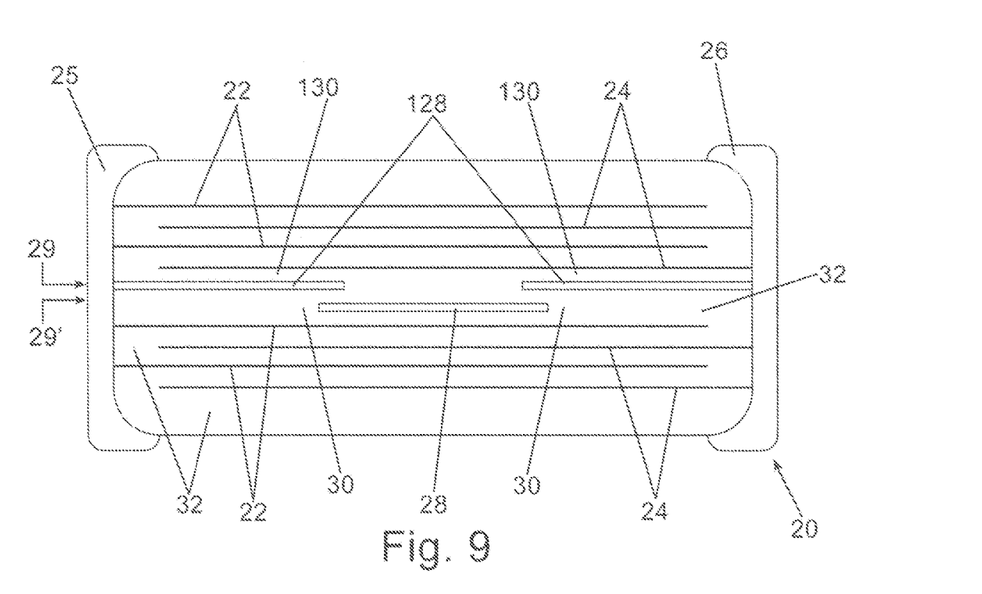
FIG. 9 is a cross-sectional schematic view of an embodiment of the invention.

An embodiment of the invention will be described with reference to FIG. 9. In FIG. 9 a capacitor, generally represented schematically at 20, comprises internal electrodes, 22 and 24, wherein adjacent electrodes terminate at different external terminations, 25 and 26, and are therefore of opposite electrical polarity. The internal electrodes have ceramic, 32, there between. First closed voids, 128, are between electrodes of opposite polarity and therefore capable of relieving any stress created in the ceramic from oscillatory movement during application of high AC voltage. A first closed void layer, 29, comprises first closed voids, 128, which are circumnavigated by a combination of ceramic in a partial band, 130, and external terminations, 25 and 26, thereby enclosing the closed void within the closed void layer. A second closed void layer, 29, adjacent to the first closed void layer, comprises at least one second closed void, 28, which is circumnavigated by a ceramic band, 30. Adjacent closed void layers provide enhanced protection relative to a single void layer.

Figure 10:
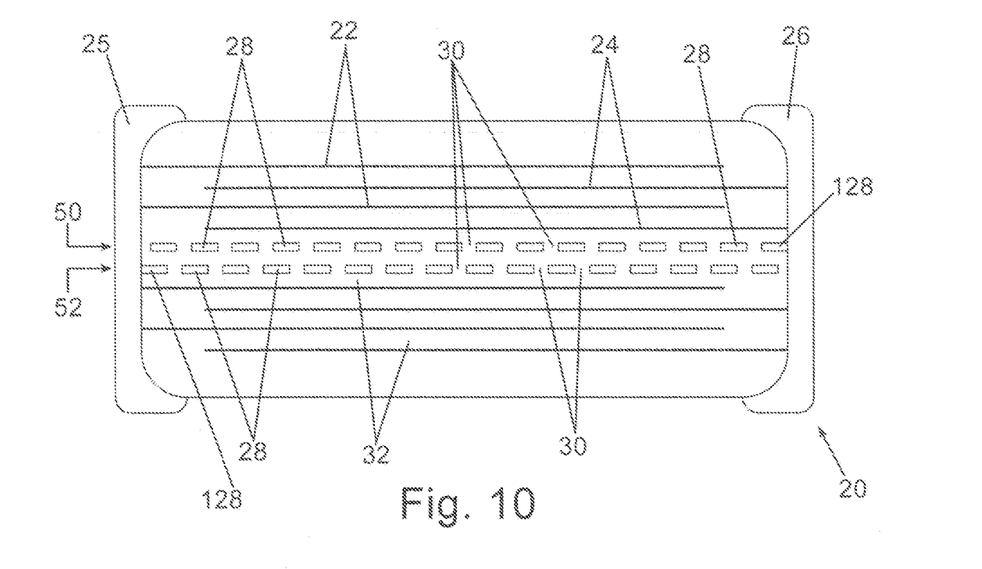
FIG. 10 is a cross-sectional schematic view of an embodiment of the invention.

An embodiment of the invention will be described with reference to FIG. 10. In FIG. 10 a capacitor, generally represented schematically at 20, comprises internal electrodes, 22 and 24, wherein adjacent electrodes terminate at different external terminations, 25 and 26, and are therefore of opposite electrical polarity. The internal electrodes have ceramic, 32, there between. A first closed void layer, 50, and second closed void layer, 52, adjacent to the first closed void layer each comprises multiple closed voids preferably with at least one closed void circumnavigated by a ceramic band and, in one embodiment, at least one closed void is circumnavigated by a combination of a partial ceramic band and external termination as discussed further herein.

Figure 11:
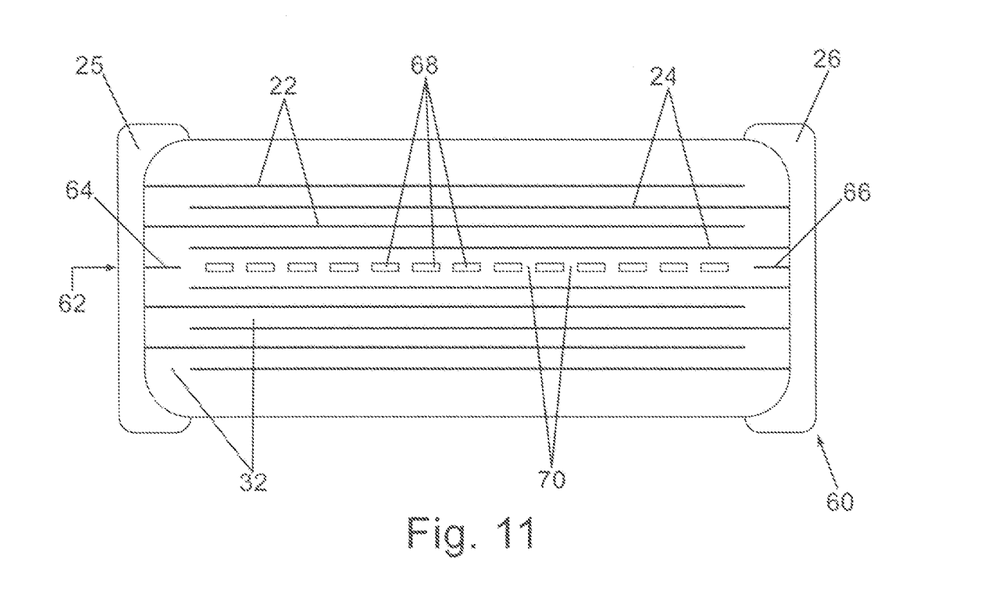
FIG. 11 is a cross-sectional schematic view of an embodiment of the invention.

An embodiment of the invention will be described with reference to FIG. 11. In FIG. 11 a capacitor is generally represented schematically at 60. In FIG. 11 the internal electrodes, 22 and 24, external terminations, 25 and 26, and ceramic, 32, are as described elsewhere herein. A closed void layer, 62, comprises partial coplanar internal electrodes, 64 and 66, of opposite polarity with at least one closed void, 68, coplanar therewith wherein at least one closed void is preferably circumnavigated by a ceramic band, 70. It is preferable that each closed void be circumnavigated by a ceramic band. In an embodiment one internal electrode may be in contact with a closed void.

Figure 12:
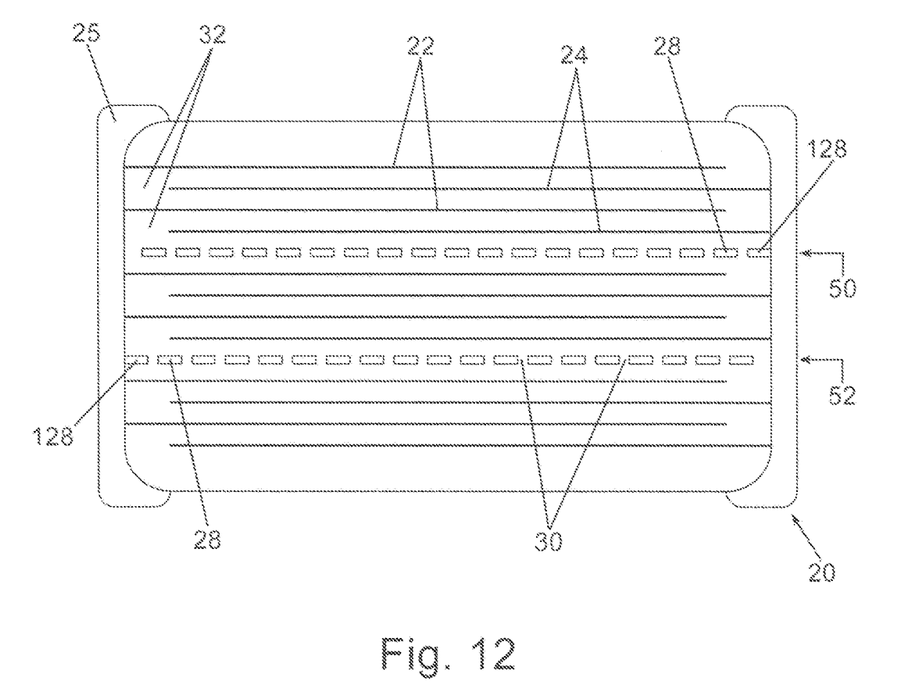
FIG. 12 is a cross-sectional schematic view of an embodiment of the invention.

An embodiment of the invention will be described with reference to FIG. 12. In FIG. 12 a capacitor, generally represented schematically at 20, comprises internal electrodes, 22 and 24, wherein adjacent electrodes terminate at different external terminations, 25 and 26, and are therefore of opposite polarity. The internal electrodes have ceramic, 32, there between. A first closed void layer, 50, and second closed void layer, 52, each of which has active electrodes of opposite electrical polarity adjacent thereto, each comprises multiple closed voids with at least one closed void circumnavigated preferably by a ceramic band and, in an embodiment, at least one closed void is circumnavigated by a combination of a partial ceramic band and external termination as discussed further herein. Since those internal electrodes separated by closed void function, to a large degree, as independent capacitive couples, the MLCC of FIG. 12 can be considered to be in three distinct zones with a first zone being the capacitive couple, and internal electrodes, above the closed void layer, a zone being the capacitive couple, and internal electrodes, between the closed void layer and a third zone being the capacitive couple, and internal electrodes, below the closed void layer. It is preferably that adjacent zones have internal electrodes of opposite polarity adjacent the closed void layer.

A particular advantage of the instant invention is that the closed voids do not require a complete separation of layers nor do they require highly reducing materials, such as carbon, to be used to form the voids. The closed voids can be introduced by disposing a layer of binder within the ceramic monolith that may or may not contain some of the ceramic materials or simply by making holes in the ceramic tape prior to layering the tape to form the monolith. The ability to form the structure is particularly advantageous for base metal inner electrodes that require thermal processing in narrow ranges of atmosphere and temperature limiting compatible co-sintered materials. Furthermore, the closed voids are not prone to ingress of processing materials, such as plating and soldering materials, that can compromise the performance of the assembled component.

To effectively function to reduce piezoelectric/electrostrictive stress the closed void, or closed void layer, are preferably positioned between electrodes of opposite polarity where the highest mechanical forces are generated.

The closed voids can be formed by a variety of techniques during the manufacture of the MLCC. Layers of ceramic precursor can be printed with a closed void layer precursor comprising sacrificial organic materials, or carbon, in a predetermined pattern corresponding to the eventual closed voids. The sacrificial organic material, or carbon, is removed, preferably by vaporization, during the bake out and co-sintering of the MLCC. Alternatively, areas of ceramic tape can be removed as a closed void precursor prior to lamination of the MLCC.

MLCC's are prepared by sequentially layering ceramic precursors and conductor precursors in appropriate registration as known in the art. After a sufficient number of layers are built up the assembly is heated to form alternating layers of internal conductors and sintered ceramic with closed void layers in the ceramic layers at appropriate locations.

In each layer intended to have a closed void, a void formation material is printed in a pattern which will correspond to the closed void. Upon sintering the void formation material vaporizes leaving a void in the shape of the printed material.

The void formation material is any material which can be applied in a predetermined pattern and, upon sintering of the layer, leaves a closed void. In a particularly preferred embodiment the closed void layer precursor comprises a material such as an electrode ink with the metal excluded there from which is referred to herein as a void precursor ink. Such materials are preferred due to their ready availability and their inherent suitability with the manufacturing environment. Another particularly suitable material is a binder, as used with the ceramic precursor, wherein the ceramic precursor is excluded.

The dielectric layers are not particularly limited herein and any dielectric suitable for use in an MLCC can be utilized for demonstration of the invention.

Each dielectric layer has a preferred thickness of up to about 50 µm, more preferably up to about 20 µm. The lower limit of thickness is about 0.5 µm, preferably about 2 µm. The number of dielectric layers stacked is generally from 2 to about 1000, preferably from 2 to about 450.

The conductor which forms the internal electrode layers is not limited herein, although a base metal is preferably used since the dielectric material of the commonly employed dielectric layers typically has anti-reducing properties. Typical base metals are nickel and nickel alloys. Preferred nickel alloys are alloys of nickel with at least one member selected from Mn, Cr, Co, and Al, with such nickel alloys containing at least 95 wt % of nickel being more preferred. It is to be noted that nickel and nickel alloys may contain up to about 0.1 wt % of phosphorous and other trace components. Other conductors which may be employed as internal electrodes such as copper, precious metal or alloys thereof with particularly preferred precious metals selected from palladium and silver. It would be understood that with copper or precious metal containing internal electrodes lower temperature firing is preferred.

The thickness of the internal electrode layers may be suitably determined in accordance with a particular purpose and application although its upper limit is typically about 5 µm, more preferably about 2.5 µm, and its lower limit is typically about 0.5 µm. Most preferable is a thickness of about 1 µm.

The conductor which forms the external electrodes is not critical, although inexpensive metals such as nickel, copper, and alloys thereof are preferred. The thickness of the external electrodes may be suitably determined in accordance with a particular purpose and application although it generally ranges from about 10 µm to about 50 µm. In one embodiment a conductive metal, preferably silver, filled epoxy termination is utilized as a termination.

The multilayer ceramic chip capacitor of the present invention generally is fabricated by forming a green chip by conventional printing and sheeting methods using pastes, firing the chip, and printing or transferring external electrodes thereto followed by baking.

Paste for forming the dielectric layers can be obtained by mixing a raw dielectric material with an organic vehicle. The raw dielectric material may be a mixture of oxides and composite oxides as previously mentioned. Also useful are various compounds which convert to such oxides and composite oxides upon firing. These include, for example, carbonates, oxalates, nitrates, hydroxides, and organometallic compounds. The dielectric material is obtained by selecting appropriate species from these oxides and compounds and mixing them. The proportion of such compounds in the raw dielectric material is determined such that after firing, the specific dielectric layer composition may be met. The raw dielectric material is generally used in powder form having a mean particle size of about 0.1 to about 3 µm, preferably about 0.5 µm.

Paste for forming internal electrode layers is obtained by mixing an electro-conductive material with an organic vehicle. The conductive material used herein includes conductors such as conductive metals and alloys as mentioned above and various compounds which convert into such conductors upon firing, for example, oxides, organometallic compounds and resinates. The binder used herein is not critical and may be suitably selected from conventional binders such as ethyl cellulose. Also, the organic solvent used herein is not critical and may be suitably selected from conventional organic solvents such as terpineol, butylcarbinol, acetone, and toluene in accordance with a particular application method such as a printing or sheeting method.

Paste for forming external electrodes is prepared by the same method as the internal electrodes layer-forming paste.

No particular limit is imposed on the organic vehicle content of the respective pastes. Often the paste contains about 1 to 5 wt % of the binder and about 10 to 50 wt % of the organic solvent. If desired, pastes may contain any other additives such as dispersants, plasticizers, dielectric compounds, and insulating compounds. The total content of these additives is preferably up to about 10 wt %.

A green chip may be prepared from the dielectric layer-forming paste and the internal electrode layer-forming paste. In the case of a printing method, a green chip is prepared by alternately printing the pastes onto a substrate of polyethylene terephthalate (PET), for example, to form a laminar stack, cutting the laminar stack to a predetermined shape and separating it from the substrate.

Also useful is a sheeting method wherein a green chip is prepared by forming green sheets from the dielectric layer-forming paste, printing the internal electrode layer-forming paste on the respective green sheets, and stacking the printed green sheets. A capacitor with a large number of layers can be prepared in this manner as well known in the art.

The method of forming the capacitor is not particularly limiting herein.

The binder is removed from the green chip and fired. Binder removal may be carried out under conventional conditions, preferably under the conditions where the internal electrode layers are formed of a base metal conductor such as nickel and nickel alloys.

For binder removal the heating rate is preferably about 5 to 300° C./hour, more preferably 10 to 100° C./hour. The holding temperature is preferably about 200 to 400° C., more preferably 250 to 300° C. and the holding time is preferably about ½ to 24 hours, more preferably 5 to 20 hours in air. An inert or reducing atmosphere may be provided at temperatures exceeding 225° C. to limit oxidation of the inner electrodes. The green chip is fired in an atmosphere which may be determined in accordance with the type of conductor in the internal electrode layer-forming paste. Where the internal electrode layers are formed of a base metal conductor such as nickel and nickel alloys, the firing atmosphere may have an oxygen partial pressure of $10^{-8}$ to $10^{-12}$ atm. Extremely low oxygen partial pressure should be avoided, since at such low pressures the conductor can be abnormally sintered and may become disconnected from the dielectric layers. At oxygen partial pressures above the range, the internal electrode layers are likely to be oxidized.

For firing, the chip preferably is held at a temperature of 1,100° C. to 1,400° C., more preferably 1,250 to 1,400° C. Lower holding temperatures below the range would provide insufficient densification whereas higher holding temperatures above the range can lead to poor DC bias performance. The heating rate is preferably 50 to 500° C./hour, more preferably 200 to 300° C./hour with a holding time of ½ to 8 hours, more preferably 1 to 3 hours. The cooling rate is preferably 50 to 500° C./hour, more preferably 200 to 300° C./hour. The firing atmosphere preferably is a reducing atmosphere. An exemplary atmospheric gas is a humidified mixture of $N_2$ and $H_2$ gases.

Firing of the capacitor chip in a reducing atmosphere is preferably followed by annealing. Annealing is effective for re-oxidizing the dielectric layers, thereby optimizing the resistance of the ceramic to dielectric breakdown. The annealing atmosphere may have an oxygen partial pressure of at least $10^{-6}$ atm., preferably $10^{-5}$ to $10^{-4}$ atm. The dielectric layers are not sufficiently re-oxidized at a low oxygen partial pressures below the range, whereas the internal electrode layers are likely to be oxidized at oxygen partial pressures above this range.

For annealing, the chip is preferably held at a temperature of lower than 1,100° C., more preferably 500° C. to 1,000° C. Lower holding temperatures below this range would oxidize the dielectric layers to a lesser extent, thereby leading to a shorter life. Higher holding temperatures above the range can cause the internal electrode layers to be oxidized, which leads to a reduced capacitance, and to react with the dielectric material, which leads to a shorter life. Annealing can be accomplished simply by heating and cooling. In this case, the holding temperature is equal to the highest temperature on heating and the holding time is zero.

The binder removal, firing, and annealing may be carried out either continuously or separately. If done continuously, the process includes the steps of binder removal, changing only the atmosphere without cooling, raising the temperature to the firing temperature, holding the chip at that temperature for firing, lowering the temperature to the annealing temperature, changing the atmosphere at that temperature, and annealing.

If done separately, after binder removal and cooling down, the temperature of the chip is raised to the binder-removing temperature in dry or humid nitrogen gas. The atmosphere then is changed to a reducing one, and the temperature is further raised for firing. Thereafter, the temperature is lowered to the annealing temperature and the atmosphere is again changed to dry or humid nitrogen gas, and cooling is continued. Alternatively, once cooled down, the temperature may be raised to the annealing temperature in a nitrogen gas atmosphere. The entire annealing step may be done in a humid nitrogen gas atmosphere.

The resulting chip may be polished at end faces by barrel tumbling and sand blasting, for example, before the external electrode-forming paste is printed or transferred and baked to form external electrodes. Firing of the external electrode-forming paste may be carried out in an inert nitrogen atmosphere gases at about 600 to 800° C., and about 10 minutes to about 1 hour.

Pads are preferably formed on the external electrodes by plating or other methods known in the art.

The external terminations are preferably formed by dipping with other methods, such as ink-jet spraying being suitable. Once deposited these external terminations are sintered or cured to adhere them to the ceramic and connect to the internal electrodes.

The multilayer ceramic chip capacitors of the invention can be mounted on printed circuit boards, for example, by soldering.

The invention has been described with reference to the preferred embodiments without limit thereto. Additional embodiments and improvements may be realized which are not specifically set forth herein but which are within the scope of the invention as more specifically set forth in the claims appended hereto.

The invention claimed is:

1. A multilayer ceramic capacitor comprising:
   first internal electrodes and second internal electrodes wherein said first internal electrodes and said second internal electrodes are parallel with dielectric there between;
   a first external termination wherein said first internal electrodes are in electrical contact with said first external termination;
   a second external termination wherein said second internal electrodes are in electrical contact with said second external termination;
   a first closed void layer comprising at least one closed void wherein said closed void layer is between a first internal electrode of said internal electrodes and a second internal electrode of said second internal electrodes; and further comprising a ceramic band at least partially circumnavigating at least one said closed void.

2. The multilayered ceramic capacitor of claim 1 wherein said ceramic band circumnavigates said closed void.

3. The multilayered ceramic capacitor of claim 1 wherein at least one said closed void is circumnavigated by a combination of said ceramic band and at least one of said first external termination or said second external termination.

4. The multilayered ceramic capacitor of claim 1 wherein said first closed void layer comprises at least two closed voids.

5. The multilayered ceramic capacitor of claim 1 further comprising at least one of said first internal electrode or said second internal electrode coplanar with said closed void layer.

6. The multilayered ceramic capacitor of claim 1 wherein said closed void represents at least 10 vol. % to no more than 90 vol. % of said closed void layer.

7. The multilayered ceramic capacitor of claim 6 wherein said closed void represents at least 50 vol. % to no more than 80 vol. % of said closed void layer.

8. The multilayered ceramic capacitor of claim 1 wherein said closed void has a thickness of at least 0.2 µm to no more than 10 µm.

9. The multilayered ceramic capacitor of claim 8 wherein said closed void has a thickness of no more than 5 µm.

10. The multilayered ceramic capacitor of claim 1 further comprising at least one shield electrode.

11. The multilayered ceramic capacitor of claim 1 further comprising at least one floating electrode parallel to said first internal electrodes.

12. The multilayered ceramic capacitor of claim 11 wherein said floating electrode is an external floating electrode.

13. The multilayered ceramic capacitor of claim 11 wherein said floating electrode is coplanar with at least one said first internal electrode.

14. The multilayered ceramic capacitor of claim 1 wherein said internal electrodes comprise at least one metal selected from the group consisting of nickel, manganese, chromium, copper, aluminum, palladium and silver.

15. The multilayered ceramic capacitor of claim 1 comprising a first zone comprising a first set of said first internal electrodes and said second internal electrodes and a second zone comprising a second set of said first internal electrodes and said second internal electrodes wherein said first zone and said second zone are separated by said first closed void layer.

16. The multilayered ceramic capacitor of claim 1 further comprising a second closed void layer.

17. The multilayered ceramic capacitor of claim 16 wherein said first closed void layer and said second closed void layer are adjacent.

18. The multilayered ceramic capacitor of claim 16 wherein said first closed void layer and said second closed void layer are each adjacent to one said first internal electrode and one said second internal electrode.

19. The multilayered ceramic capacitor of claim 16 wherein said ceramic band circumnavigates said closed void.

20. The multilayered ceramic capacitor of claim 16 wherein at least one said closed void is circumnavigated by a combination of said ceramic band and at least one of said first external termination or said second external termination.

21. A multilayer ceramic capacitor comprising:
   first internal electrodes and second internal electrodes wherein said first internal electrodes and said second internal electrodes are parallel with dielectric there between;
   a first external termination wherein said first internal electrodes are in electrical contact with said first external termination;
   a second external termination wherein said second internal electrodes are in electrical contact with said second external termination;
   a first closed void layer comprising at least one closed void wherein said closed void layer is between a first internal electrode of said internal electrodes and a second internal electrode of said second internal electrodes; and further comprising a second closed void layer.

22. The multilayered ceramic capacitor of claim 21 wherein said first closed void layer and said second closed void layer are adjacent.

23. The multilayered ceramic capacitor of claim 21 wherein said first closed void layer and said second closed void layer are each adjacent to one said first internal electrode and one said second internal electrode.

24. The multilayered ceramic capacitor of claim 21 further comprising a ceramic band at least partially circumnavigating at least one said closed void.

25. The multilayered ceramic capacitor of claim 21 wherein said first closed void layer comprises at least two closed voids.

26. The multilayered ceramic capacitor of claim 21 further comprising at least one of said first internal electrode or said second internal electrode coplanar with said closed void layer.

27. The multilayered ceramic capacitor of claim 21 wherein said closed void represents at least 10 vol. % to no more than 90 vol. % of said closed void layer.

28. The multilayered ceramic capacitor of claim 27 wherein said closed void represents at least 50 vol. % to no more than 80 vol. % of said closed void layer.

29. The multilayered ceramic capacitor of claim 21 wherein said closed void has a thickness of at least 0.2 µm to no more than 10 µm.

30. The multilayered ceramic capacitor of claim 29 wherein said closed void has a thickness of no more than 5 µm.

31. The multilayered ceramic capacitor of claim 21 further comprising at least one shield electrode.

32. The multilayered ceramic capacitor of claim 21 further comprising at least one floating electrode parallel to said first internal electrodes.

33. The multilayered ceramic capacitor of claim 32 wherein said floating electrode is an external floating electrode.

34. The multilayered ceramic capacitor of claim 32 wherein said floating electrode is coplanar with at least one said first internal electrode.

35. The multilayered ceramic capacitor of claim 21 wherein said internal electrodes comprise at least one metal selected from the group consisting of nickel, manganese, chromium, copper, aluminum, palladium and silver.

36. The multilayered ceramic capacitor of claim 21 comprising a first zone comprising a first set of said first internal electrodes and said second internal electrodes and a second zone comprising a second set of said first internal electrodes and said second internal electrodes wherein said first zone and said second zone are separated by said first closed void layer.

\* \* \* \* \*